United States Patent
Hayashi

(10) Patent No.: US 10,406,943 B2
(45) Date of Patent: Sep. 10, 2019

(54) VEHICLE SEAT

(71) Applicant: TOYOTA BOSHOKU KABUSHIKI KAISHA, Aichi-ken (JP)

(72) Inventor: Hiroaki Hayashi, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 9 days.

(21) Appl. No.: 15/690,727

(22) Filed: Aug. 30, 2017

(65) Prior Publication Data

US 2018/0079326 A1    Mar. 22, 2018

(30) Foreign Application Priority Data

Sep. 16, 2016 (JP) ................. 2016-181582

(51) Int. Cl.
*B60N 2/16* (2006.01)
*B60N 2/02* (2006.01)
*B60R 22/26* (2006.01)
*B60N 2/68* (2006.01)

(52) U.S. Cl.
CPC ......... *B60N 2/1615* (2013.01); *B60N 2/0232* (2013.01); *B60N 2/1635* (2013.01); *B60N 2/682* (2013.01); *B60R 22/26* (2013.01); *B60N 2002/024* (2013.01)

(58) Field of Classification Search
CPC .. B60N 2/0232; B60N 2/1615; B60N 2/1635; B60N 2002/024; B60N 2/682; B60R 22/26
See application file for complete search history.

(56) References Cited

U.S. PATENT DOCUMENTS

| | | | | |
|---|---|---|---|---|
| 4,225,184 A | * | 9/1980 | Strowick | B60R 22/26 248/393 |
| 4,248,480 A | * | 2/1981 | Koucky | B60N 2/0825 248/393 |
| 4,257,626 A | * | 3/1981 | Adomeit | B60N 2/4221 280/805 |
| 4,487,454 A | * | 12/1984 | Biller | B60R 22/26 248/420 |
| 4,790,597 A | * | 12/1988 | Bauer | B60R 22/26 248/429 |
| 5,158,339 A | * | 10/1992 | Miyanaga | B60R 22/26 297/224 |
| 5,226,697 A | * | 7/1993 | Borlinghaus | B60R 22/26 297/216.18 |
| 5,971,488 A | * | 10/1999 | Pedronno | B60N 2/4221 280/806 |

(Continued)

FOREIGN PATENT DOCUMENTS

JP    7-108860    4/1995

*Primary Examiner* — James M Ference
(74) *Attorney, Agent, or Firm* — Greenblum & Bernstein, P.L.C.

(57) ABSTRACT

A vehicle seat including: a seat cushion; a seat lifter including a link which connects the seat cushion and a base on a vehicle body and is configured to rotate about an axis extending in a seat width direction and configured to adjust a height of the seat cushion with respect to the vehicle body by the rotation of the link; and a fixture for fixing a seat belt which is abutted and attached to a mounting surface portion of the link, the mounting surface portion being formed on an outer surface portion of the link and obliquely facing a front side.

8 Claims, 8 Drawing Sheets

(56) References Cited

U.S. PATENT DOCUMENTS

| | | | | |
|---|---|---|---|---|
| 6,069,325 A * | 5/2000 | Aoki | B60N 2/002 | 177/136 |
| 6,116,689 A * | 9/2000 | Bauer | B60N 2/1615 | 297/344.15 |
| 6,299,252 B1 * | 10/2001 | Frohnhaus | B60N 2/0232 | 248/419 |
| 6,467,849 B1 * | 10/2002 | Deptolla | B60R 22/26 | 297/216.1 |
| 6,505,888 B1 * | 1/2003 | Teufel | B60N 2/4221 | 297/216.1 |
| 6,572,065 B2 * | 6/2003 | Koga | B60N 2/067 | 248/421 |
| 6,902,234 B2 * | 6/2005 | Becker | B60N 2/0715 | 248/421 |
| 7,036,878 B2 * | 5/2006 | Masutani | B60N 2/0732 | 297/216.1 |
| 7,314,249 B2 * | 1/2008 | Becker | B60N 2/002 | 297/344.15 |
| 7,338,118 B2 * | 3/2008 | Ichikawa | B60N 2/071 | 297/216.1 |
| 7,527,332 B2 * | 5/2009 | Sakai | B60N 2/1615 | 297/216.1 |
| 7,658,443 B2 * | 2/2010 | Musale | B60N 2/1615 | 297/216.1 |
| 8,113,575 B2 * | 2/2012 | Masutani | B60N 2/42763 | 297/216.1 |
| 8,282,162 B2 * | 10/2012 | Masutani | B60N 2/1615 | 297/216.1 |
| 8,573,691 B2 * | 11/2013 | Masutani | B60N 2/4221 | 297/216.1 |
| 9,108,539 B2 * | 8/2015 | Park | B60N 2/1615 | |
| 9,283,926 B2 * | 3/2016 | Thomas | B60N 2/16 | |
| 10,207,601 B2 * | 2/2019 | Suzuki | B60N 2/1615 | |
| 2003/0227204 A1 * | 12/2003 | Akaike | B60N 2/1615 | 297/330 |
| 2007/0137978 A1 * | 6/2007 | Yamada | B60N 2/1615 | 192/223.2 |
| 2007/0222272 A1 * | 9/2007 | Taylor | B60R 22/26 | 297/468 |
| 2008/0048086 A1 * | 2/2008 | Kojima | B60N 2/0705 | 248/429 |
| 2009/0108570 A1 * | 4/2009 | Itoga | B60R 21/18 | 280/730.2 |
| 2011/0241406 A1 * | 10/2011 | Fukuzawa | B60R 22/26 | 297/474 |
| 2012/0049598 A1 * | 3/2012 | Fujihara | B60N 2/1615 | 297/338 |
| 2012/0104218 A1 * | 5/2012 | Nonomiya | B60N 2/0715 | 248/429 |
| 2014/0217787 A1 * | 8/2014 | Fukuzawa | B60R 22/1952 | 297/216.1 |
| 2015/0021895 A1 * | 1/2015 | Hirako | B60R 22/26 | 280/801.1 |
| 2015/0258955 A1 * | 9/2015 | Jayasuriya | B60R 22/023 | 297/353 |
| 2015/0321581 A1 * | 11/2015 | Ito | H02K 7/10 | 318/3 |
| 2016/0031411 A1 * | 2/2016 | Shimazu | B60R 22/20 | 297/482 |
| 2017/0120778 A1 * | 5/2017 | Suzuki | B60N 2/1615 | |
| 2018/0079326 A1 * | 3/2018 | Hayashi | B60N 2/0232 | |

\* cited by examiner

VEHICLE SEAT

CROSS-REFERENCE TO RELATED APPLICATIONS

This application claims priority from Japanese Patent Application No. 2016-181582 filed on Sep. 16, 2016, the entire contents of which are incorporated herein by reference.

TECHNICAL FIELD

The disclosure relates to a vehicle seat, and particularly, to a vehicle seat that includes a seat lifter configured to adjust a height of a seat cushion with respect to a vehicle body.

BACKGROUND

There is known an automobile seat having a configuration in which a lap anchor of a seat belt is mounted to a bracket serving as a connecting portion between a seat cushion and a slide rail (see JP-A-H07-108860). With such a configuration, the lap anchor moves following a sliding motion of the automobile seat, and thus, the tension of the seat belt is kept constant even when the automobile seat is slid.

However, in the above-described related art, the lap anchor on the slide rail cannot follow the movement of the automobile seat when the automobile seat is equipped with a seat lifter. Accordingly, there is a possibility that the tension of the seat belt becomes tight due to the lift-up of the automobile seat.

SUMMARY

An object to be achieved by the disclosure is to allow a fixture for fastening the seat belt to appropriately follow the movement of the seat lifter.

According to an aspect of the disclosure, there is provided a vehicle seat including: a seat cushion; a seat lifter including a link which connects the seat cushion and a base on a vehicle body and is configured to rotate about an axis extending in a seat width direction and configured to adjust a height of the seat cushion with respect to the vehicle body by the rotation of the link; and a fixture for fixing a seat belt which is abutted and attached to a mounting surface portion of the link, the mounting surface portion being formed on an outer surface portion of the link and obliquely facing a front side.

Accordingly, the fixture for fixing the seat belt can be moved appropriately following the height adjustment of the seat cushion according to the rotation of the link. Further, since the mounting surface portion of the link, to which the fixture is attached, obliquely faces the front side, the fixture can be attached to the mounting surface portion in a state of being oriented in a direction to be pulled from the seat belt, so that the fixture can be installed in a state where it is hardly twisted even when receiving the tension. Further, since the mounting direction of the fixture to the mounting surface portion is set to the direction from the front side rather than from the lateral side, the fixture can be attached from a front open space even when there is no wide mounting space on the lateral side of the mounting surface portion.

DETAILED DESCRIPTION

Hereinafter, embodiments for carrying out the disclosure will be described with reference to the drawings.

First Embodiment

<Basic Configuration of Seat 1>

Figure 1:
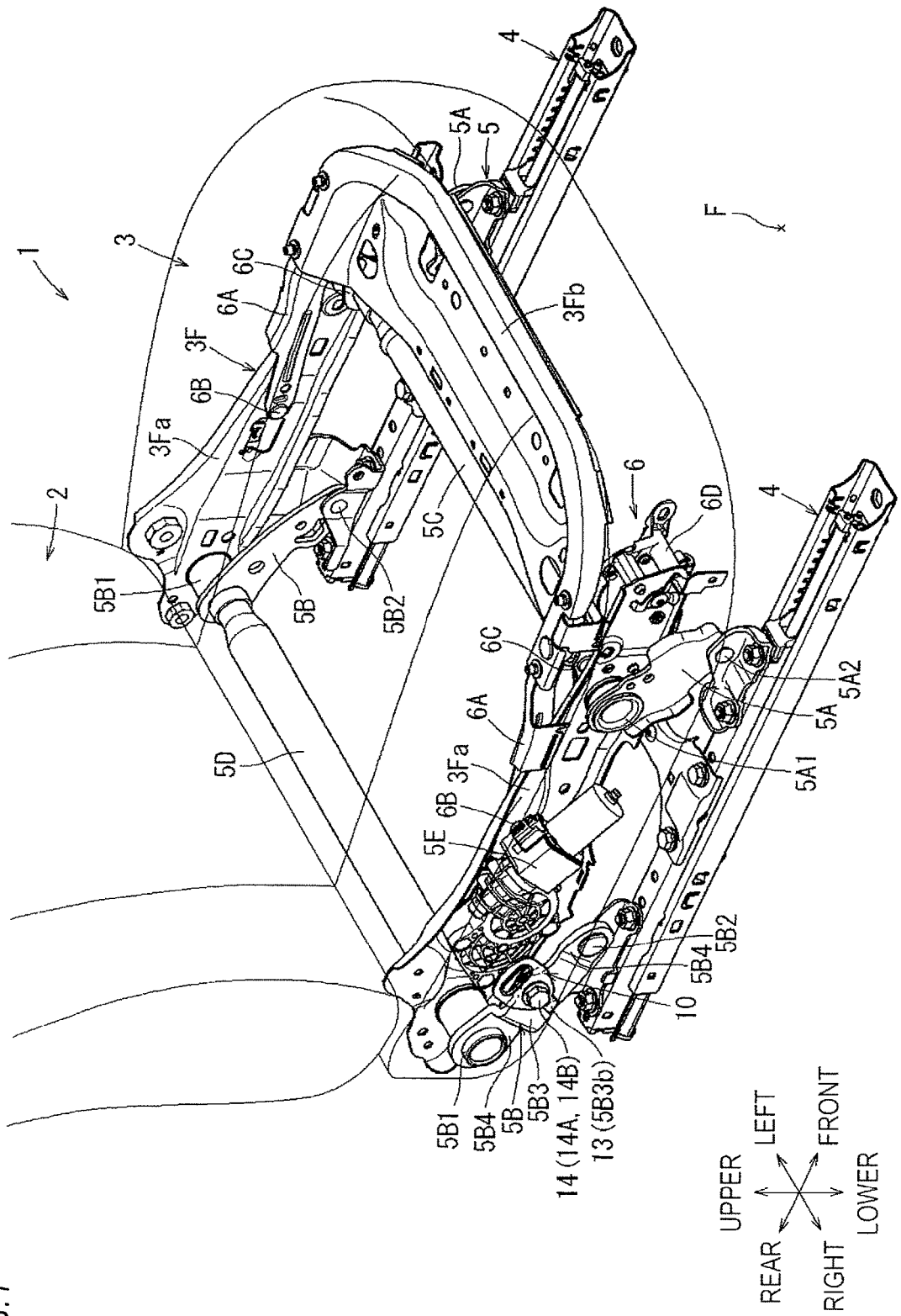
FIG. 1 is a perspective view showing a schematic configuration of a vehicle seat according to a first embodiment.

First, a configuration of a seat 1 (vehicle seat) according to a first embodiment is described with reference to FIGS. 1 to 7. As shown in FIG. 1, the seat 1 of the present embodiment is configured as a right seat of an automobile and includes a seat back 2 serving as a backrest of a seated occupant and a seat cushion 3 serving as a seating part. The seat 1 is configured as a so-called "power seat," so that it is possible to adjust a backrest angle of the seat back 2 and to adjust a seating position of the seat cushion 3 by an electric operation using an operation of a switch, respectively.

Specifically, the seat back 2 is configured such that lower end portions of both left and right sides thereof are connected to rear end portions of both left and right sides of the seat cushion 3 through electric recliners (not shown), respectively. In this way, the seat back 2 is normally held in a state where its backrest angle is fixed by the above-described recliners (not shown). As the recliners are electrically operated by an operation of a switch (not shown), the backrest angle of the seat back 2 is adjusted in a front and rear direction.

The seat cushion 3 is connected on a floor F of an automobile via a pair of left and right electric slide rails 4. In this way, the seat cushion 3 is normally held in a state where its seating position is fixed by the above-described slide rails 4. As the slide rails 4 are electrically operated by an operation of a switch (not shown), the seating position of the seat cushion 3 is adjusted in the front and rear direction. Here, the slide rails 4 correspond to the "base" of the disclosure.

The seat cushion 3 is configured such that an electric seat lifter 5 is provided between the pair of left and right slide rails 4 described above and the seat cushion 3, respectively. In this way, the seat cushion 3 is normally held in a state where its seating height is fixed by the seat lifters 5. As the seat lifters 5 are electrically operated by an operation of a switch (not shown), the seating height of the seat cushion 3 is adjusted.

The seat cushion 3 is configured such that electric front tilt mechanisms 6 are provided at a front portion thereof. In this way, the seat cushion 3 is normally held in a state where a support angle of the front portion supporting the thigh portion of the seated occupant is fixed by the front tilt mechanisms 6 described above. As the front tilt mechanisms 6 are electrically operated by an operation of a switch (not shown), the support angle of the front portion is adjusted in a height direction.

In this way, the seat 1 is configured such that the adjustment in eight directions including the adjustment of the backrest angle of the seat back 2 (front and rear directions), the adjustment of the seating position of the seat cushion 3 (front and rear directions and up and down directions) and the adjustment of the support angle of the front portion of the seat cushion 3 (two up and down directions) can be made. These adjustment is performed by an operation of an electric switch (not shown) provided at a place such as a side portion of the seat cushion 3 on the outside in a vehicle width direction (i.e., the left side in the drawing).

Figure 2:
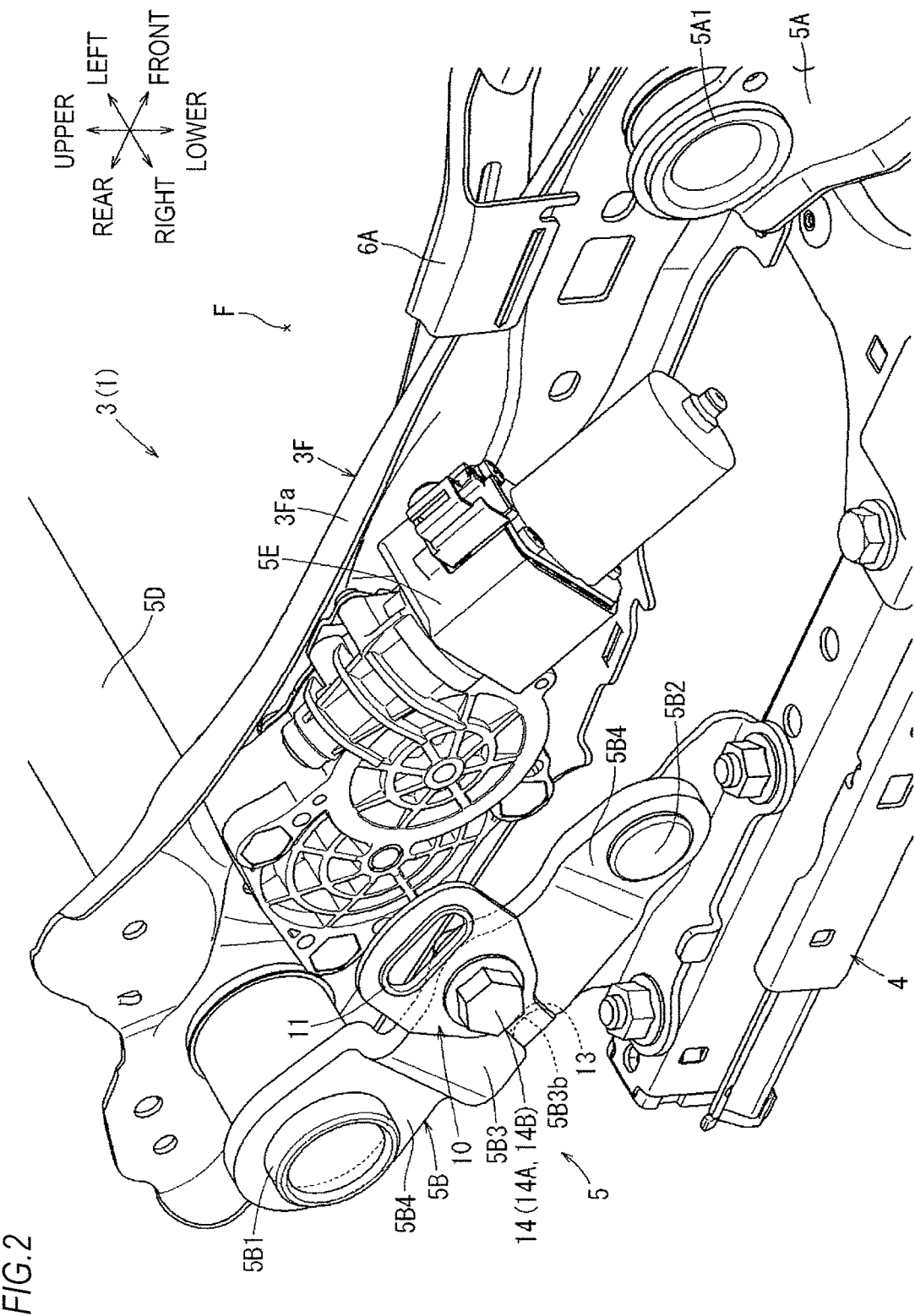
FIG. 2 is an enlarged perspective view showing a main part of the vehicle seat.
Figure 4:
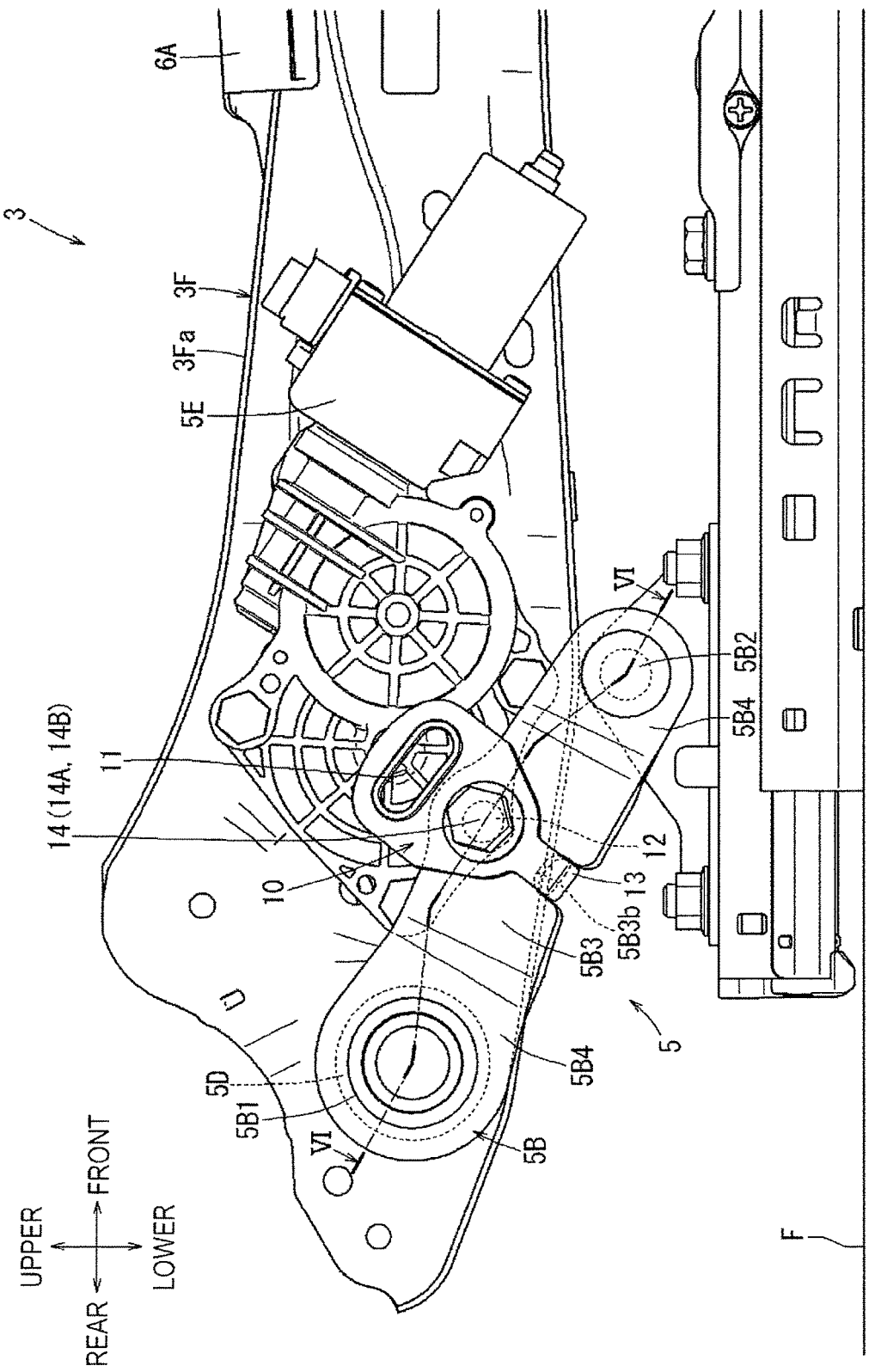
FIG. 4 is a side view of a main part showing a state where a seat lifter is lowered.
Figure 5:
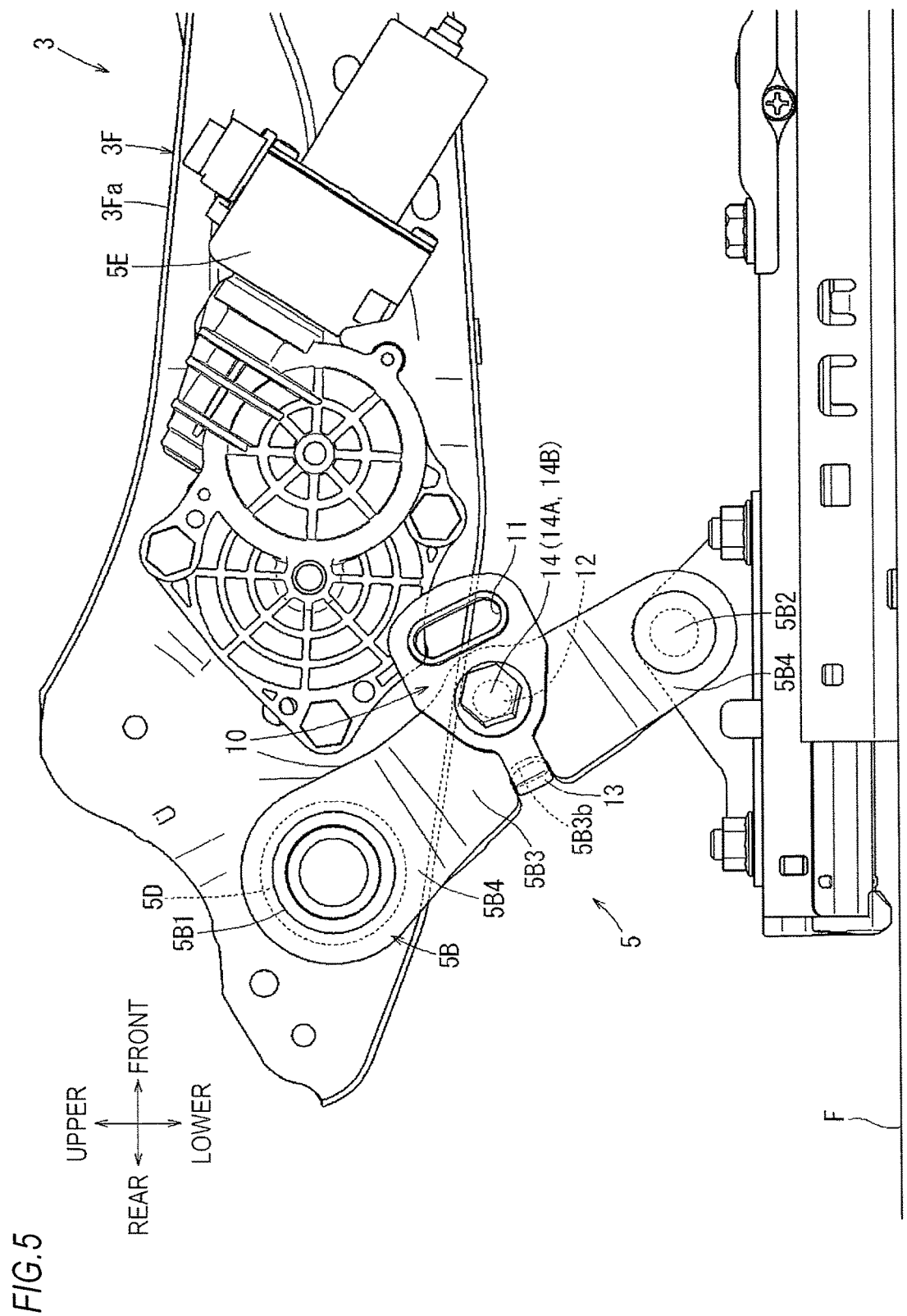
FIG. 5 is a side view of the main part showing a state where the seat lifter is raised.

Further, as shown in FIG. 2, the seat 1 is configured such that a lap anchor 10 attached to a terminal end of a belt webbing of a seat belt (not shown) is attached to a rear link 5B provided at an outer side in the vehicle width direction and configuring each seat lifter 5 described above. Since the lap anchor 10 is attached to such a position, the lap anchor 10 can appropriately follow the motion of raising or lowering the seating height of the seat cushion 3 by rotating the rear link 5B of the seat lifter 5, as shown in FIGS. 4 and 5. Here, the rear link 5B provided on the outer side in the vehicle width direction corresponds to the "link" of the disclosure.

Since the lap anchor 10 moves following the rotation of the rear link 5B as described above, the position of the lap anchor 10 to the seat cushion 3 is hardly fluctuated even when the seating height of the seat cushion 3 is raised or lowered. Therefore, the tension of the seat belt can be kept constant at all times without being tightened or loosened due to the raising or lowering movement of the seat lifter 5.

Further, as shown in FIGS. 1 and 2, the rear link 5B on the outer side in the vehicle width direction, to which the lap anchor 10 is attached, is connected to a drive unit 5E that outputs a rotational driving force or a braking force for raising and lowering the seat lifter 5. With this configuration, the rear link 5B on the outer side in the vehicle width direction is configured such that it is rotationally operated or stopped directly by receiving power transmission from the drive unit 5E. The lap anchor 10 is attached to the rear link 5B that receives the transmission of the braking force from the drive unit 5E in this manner. Thus, when a large load such as the body pressure of the seated occupant, which is strongly pressed against the seat belt due to the front collision of an automobile or the like, is inputted, the rear link 5B to which the lap anchor 10 is attached is not pivoted by the load input, and this load can be stably received at a predetermined position.

Meanwhile, since the lap anchor 10 is attached to the position as described above, the lap anchor 10 can move following the motion of the seat cushion even when the seat cushion 3 is moved back and forth by the operation of the slide rail 4 described above. Therefore, the tension of the seat belt can be kept constant at all times without being tightened or loosened due to the movement of the slide rail 4.

In the seat 1, a buckle for mounting a tongue plate through which the belt webbing of the above-described seat belt (not shown) has passed is also mounted on the slide rail 4 on the inner side in the vehicle width direction. With this configuration, the buckle (not shown) can also move following the motion of the slide rail 4. Therefore, by the configuration in which both the buckle (not shown) and the lap anchor 10 follow the motion of the slide rail 4, the tension of the seat belt can be kept constant at all times without being tightened or loosened even when the slide rail 4 moves.

<Seat Cushion 3>

Next, a specific mounting structure of the above-described lap anchor 10 to the rear link 5B on the outer side in the vehicle width direction will be described in detail together with a specific configuration of the seat cushion 3. First, the configuration of the seat cushion 3 is described. As shown in FIG. 1, the seat cushion 3 has a configuration in which a metallic cushion frame 3F forming a framework is assembled into a rectangular frame shape in a plan view along an outer peripheral shape of the seat cushion 3.

Specifically, the cushion frame 3F has a pair of left and right side frames 3Fa and a front panel 3Fb which is bridged between front end portions of the side frames 3Fa and supports the thigh portion of the seated occupant from the lower side. A front pipe 5C and a rear pipe 5D each made of a metallic round pipe material are respectively bridged in the seat width direction between front portions and between rear portions of the side frames 3Fa via each of bushings 5A1, 5B1 (to be described later). In this manner, the cushion frame 3F is entirely assembled in a rectangular frame shape as seen in a plan view. A support spring (not shown) for elastically and softly supporting, from the lower side, a cushion pad (not shown) assembled to an upper portion of the cushion frame 3F is suspended between the front pipe 5C and the rear pipe 5D.

Each of the side frames 3Fa described above is formed of a single steel plate material press-cut into a plate shape elongated in a front and rear direction. Each of the side frames 3Fa is erected in a shape whose surface faces in the seat width direction. An upper edge portion and a lower edge portion of each side frame are bent to the outside of the seat. In this way, each side frame is configured to have enhanced structural strength against the bending and twisting.

The front panel 3Fb is formed of a single steel plate material press-cut into a plate shape elongated in the seat width direction. The front panel 3Fb is set to straddle between front end portions of the above-described side frames 3Fa in a shape whose surface faces in a height direction from the upper side of the seat. The front panel 3Fb is installed in a state where, on the inner side of the side frames 3Fa, tilt arms 6A coupled to both left and right side portions of the front panel and extending rearward are rotatably shaft-connected by rotation shafts 6B arranged coaxially with each other and facing the seat with direction, respectively. In this way, the front panel 3Fb is configured such that the angle of the upper surface supporting the thigh portion of the seated occupant can be changed by the rotation of the front panel 3Fb in the height direction around each of the above-described rotation shafts 6B.

<Seat Lifter 5>

The seat lifter 5 is configured by a pair of left and right four-joint link mechanism which includes a pair of left and right front links 5A, a pair of left and right rear links 5B, and the drive unit 5E that transmits a rotational driving force or braking force for a raising and lowering operation to the rear link 5B on the outer side in the vehicle width direction Each of the front links 5A is respectively arranged on the outer side in the vehicle width direction with respect to the above-described side frame 3Fa on each side, so as to be asymmetric in the vehicle width direction. In each front link 5A, an upper end portion is assembled in a state of being rotatably shaft-connected to the side frame 3Fa on each side via a cylindrical bushing 5A1, and a lower end portion is assembled in a state of being rotatably shaft-connected to an upper portion of the slide rail 4 on each side via a connecting shaft 5A2. A stepped circular tube-shaped front pipe 5C is inserted between the above-described bushings 5A1 from the inside in the seat width direction in such a way that both ends of the front pipe 5C with reduced diameter are fitted into cylinders of these bushings 5A1. The front pipe 5C is assembled in a state of being rotatably shaft-connected to these bushings.

Each of the rear links 5B is respectively arranged on the outer side in the vehicle width direction with respect to the side frame 3Fa on each side, so as to be asymmetric in the vehicle width direction. Then, also in each rear link 5B, an upper end portion is assembled in a state of being rotatably shaft-connected to the side frame 3Fa on each side via a cylindrical bushing 5B1, and a lower end portion is assembled in a state of being rotatably shaft-connected to the upper portion of the slide rail 4 on each side via a connecting shaft 5B2. A stepped circular tube-shaped rear pipe 5D is inserted between the above-described bushings 5B1 from the inside in the seat width direction in such a way that both ends of the rear pipe 5D with reduced diameter are fitted into cylinders of these bushings 5B1. The rear pipe 5D is assembled in a state of being integrally coupled to these bushings. With this assembling, the rear links 5B can be integrally pivoted with each other via the above-described rear pipe 5D, so that the structural strength against the bending and twisting is increased.

The drive unit 5E for transmitting a rotational driving force or braking force to the rear link 5B is connected to the rear link 5B on the outer side in the vehicle width direction via the bushing 5B1. The drive unit 5E is configured such that its main structure such as a drive motor is attached to an outer portion of the side frame 3Fa on the outer side in the vehicle width direction. The drive unit 5E is configured such that, at the inner side of the side frame 3Fa, the main structure is connected, in a power-transmittable state, to the bushing 5B1 integrally coupled to the rear link 5B on the outer side in the vehicle width direction via a gear connection structure (not shown). In this way, the rotational driving force outputted from the drive unit 5E is transmitted to the rear link 5B on the outer side in the vehicle width direction.

As the above-described drive unit 5E is operated by an operation of a switch (not shown), the seat lifter 5 is operated such that its pivoting force is transmitted to the rear link 5B on the outer side in the vehicle width direction, and thus, the rear link 5B and the front link 5A on each side are movable in a linking manner by a rotation motion having a single degree of freedom. Further, when the operation of the switch (not shown) is not performed, the seat lifter 5 is kept in a state where the movement of the rear link 5B and the front link 5A on each side is simultaneously stopped by a braking force exerted by the drive unit 5E.

<Front Tilt Mechanism>

The front tilt mechanism 6 includes the tilt arms 6A coupled to both left and right side portions of the above-described front panel 3Fb and extending rearward, the rotation shafts 6B rotatably shaft-connecting rear end portions of the tilt arms 6A to the side frames 3Fa, a pair of left and right bending/stretching links 6C linked between the front panel 3Fb and the front pipe 5C, and drive units 6D that transmit a pivoting force or braking force for a bending/stretching operation to the bending/stretching links 6C on the outer side in the vehicle width direction.

Although not shown in detail, the front pipe 5C is inserted into end portions on the base side of the above-described bending/stretching links 6C, so that the bending/stretching links 6C are connected to each other so as to be integrally rotatable via the front pipe 5C. The drive units 6D are attached to the side frames 3Fa on the outer side in the vehicle width direction. The drive units 6D are connected to the bending/stretching links 6C provided on the same side so as to be able to transmit the rotational driving force or braking force thereto.

As the above-described drive units 6D are operated by an operation of a switch (not shown), the front tilt mechanism 6 is operated such that its rotational driving force is transmitted to the bending/stretching links 6C on the outer side in the vehicle width direction and the bending/stretching links 6C on each side are simultaneously bent and stretched. The front tilt mechanism 6 is configured such that the front panel 3Fb is raised or lowered about the rotation shafts 6B with respect to the front pipe 5C by the bending/stretching motion of the bending/stretching links 6C. Further, when the operation of the switch (not shown) is not performed, the front tilt mechanism 6 is kept in state where the movement of the bending/stretching links 6C is simultaneously stopped by a braking force exerted by the drive units 6E.

<Mounting Structure of Lap Anchor 10 to Rear Link 5B on the Outer Side in the Vehicle Width Direction>

Figure 3:
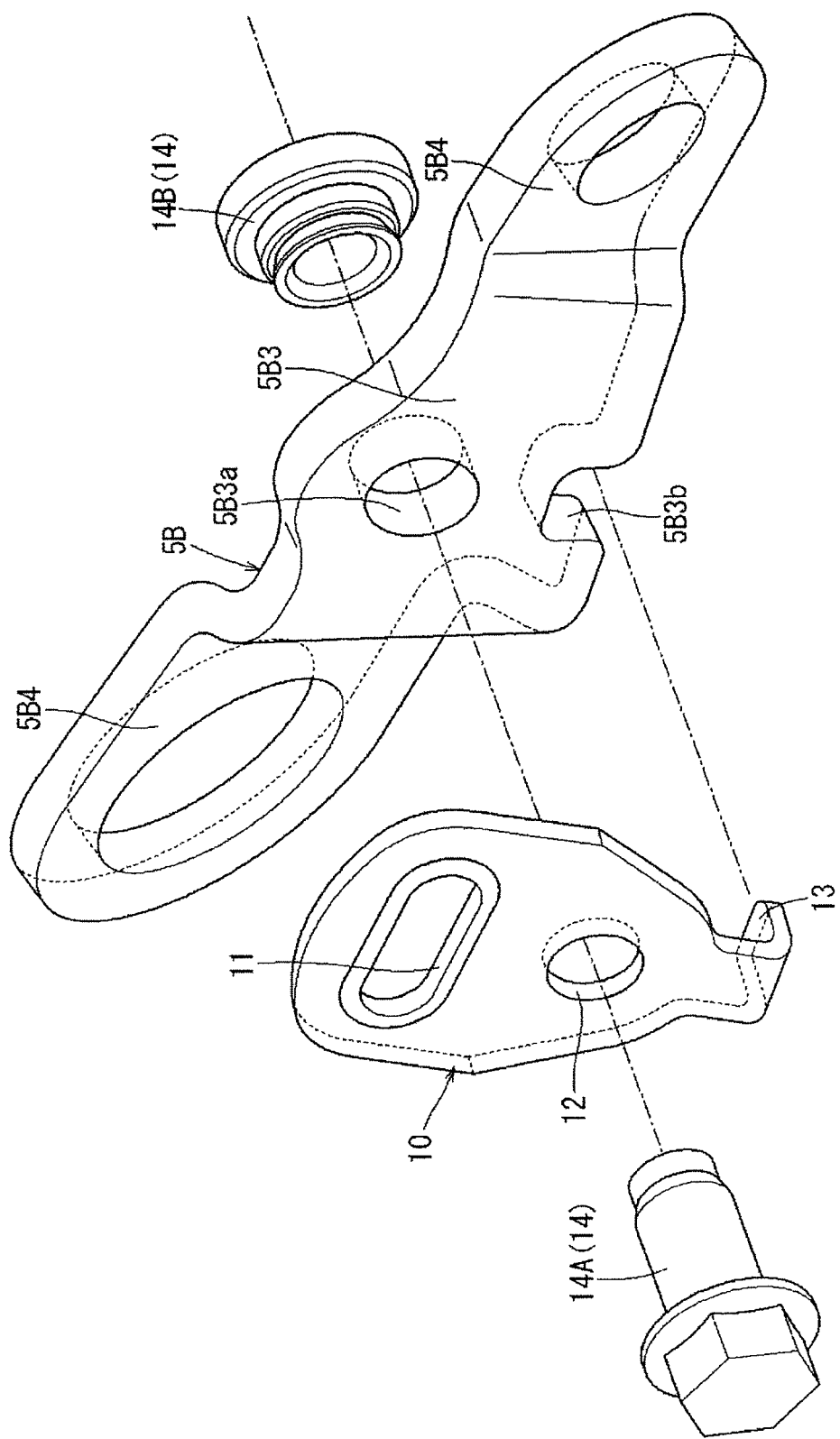
FIG. 3 is an exploded perspective view of a link and a fixture.
Figure 6:
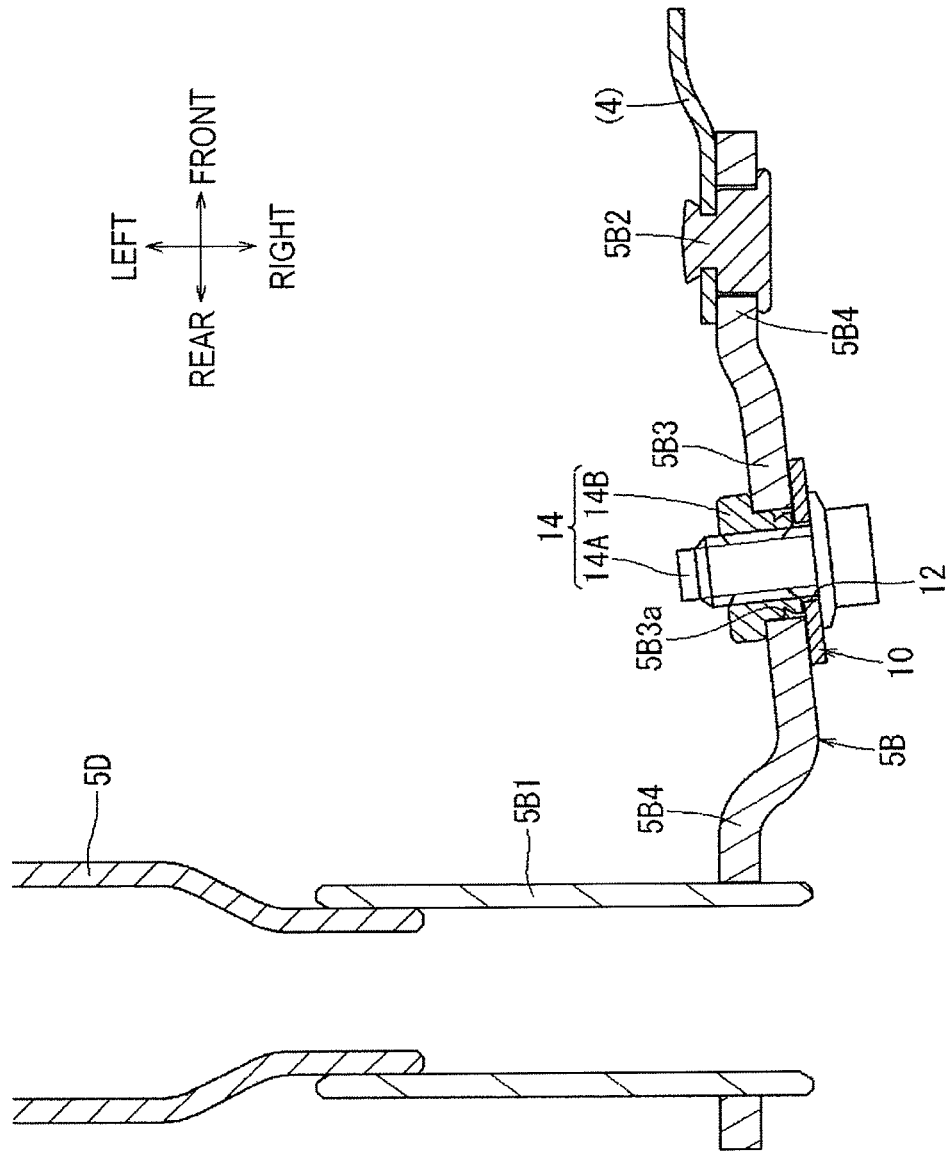
FIG. 6 is a sectional view taken along the line VI-VI in FIG. 4.

Subsequently, the mounting structure of the above-described lap anchor 10 to the rear link 5B on the outer side in the vehicle width direction will be described. As shown in FIGS. 2 and 3, the above-described lap anchor 10 is formed of a single steel plate material press-cut into a substantially flat plate shape. As shown in FIGS. 3 and 6, the lap anchor 10 is set in a state of being brought into surface contact, from the outer side in the seat width direction, with a mounting surface portion 5B3 formed substantially at the center in the link length direction of the above-described rear link 5B on the outer side in the vehicle width direction. The lap anchor 10 is fastened to the mounting surface portion 5B3 of the rear link 5B by an insertion type fastening structure 14 including a bolt 14A and a nut 14B penetrating therethrough, so that the lap anchor 10 is integrally attached thereto.

Figure 7:
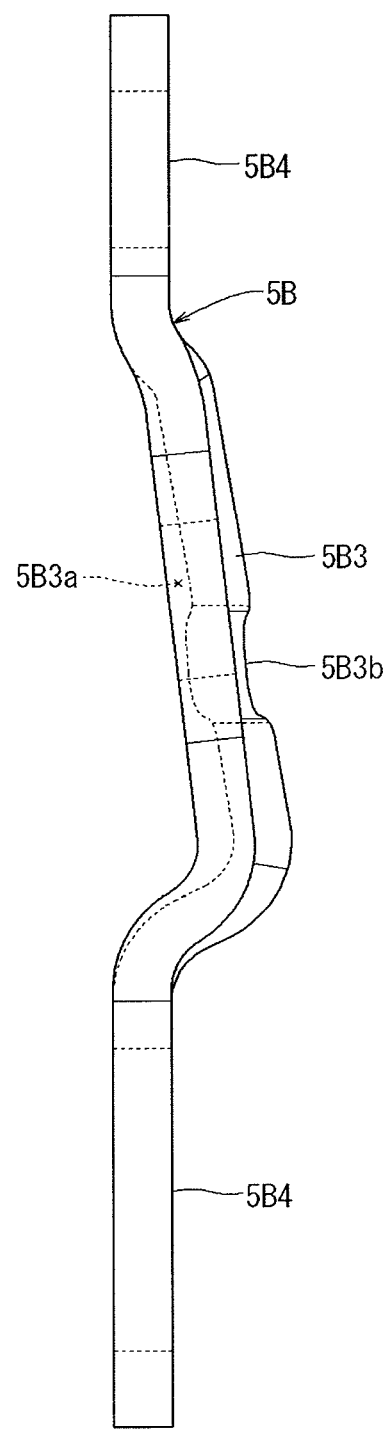
FIG. 7 is a plan view of a single link.

Specifically, as shown in FIGS. 3, 6 and 7, the mounting surface portion 5B3 of the above-described rear link 5B is formed by being bent in such a way that the approximately central portion in the link length direction of the rear link 5B partially protrudes to the outer side in the seat direction with respect to both end portions 5B4 of the rear link 5B. Specifically, the mounting surface portion 5B3 has a shape bent to be obliquely extruded with respect to the both end portions 5B4 whose surfaces face straightly in the seat width direction such that its extruded outer surface in the seat width direction has a shape whose surface obliquely faces the front side and upper side of the seat.

With the above configuration, the mounting surface portion 5B3, to which the lap anchor 10 is attached, obliquely faces the front side and upper side of the seat at the position where the mounting surface portion 5B3 protrudes further outward than other portions (both end portions 5B4) of the rear link 5B. Therefore, when attaching the lap anchor 10 to the mounting surface portion 5B3 of the rear link 5B having the above configuration, even when a space in the vehicle width direction between the rear link 5B and an interior material (B pillar or the like) of an automobile (not shown) adjacent to the rear link on the outer side in the vehicle width direction is narrowed due to the seat 1 being assembled on the floor F of an automobile first (see FIGS. 1 and 2), since the mounting surface portion 5B3 of the rear link 5B, to which the lap anchor 10 will be attached, is disposed so as to obliquely face the front side and the upper side, the mounting direction of the lap anchor 10 to the mounting surface portion 5B3 is converted to the obliquely forward and upward direction, and thus, a working space for mounting is expanded in a form opening obliquely forward and upward.

As shown in FIG. 3, a round hole-shaped insertion hole 5B3a into which a shaft portion of the bolt 14A (to be described later) is inserted and a square hole-shaped hooking hole 5B3b in which a hook portion 13 of the lap anchor 10 (to be described later) is hooked are formed to penetrate substantially at the center portion and the edge portion of the mounting surface portion 5B3 of the rear link 5B, respectively. As shown in FIGS. 2, 4, 5, the hooking hole 5B3b is formed in a shape having a hole width capable of achieving a fitting state where the hook portion 13 of the lap anchor 10 (to be described later) is hooked in the hooking hole 5B3b, and thus, the hook portion 13 is not laterally displaced in the link length direction of the rear link 5B.

Meanwhile, as shown in FIG. 3, the lap anchor 10 is formed of a steel plate press-cut into a substantially pentagonal flat plate shape. The lap anchor 10 is formed in a shape that includes an elongated hole-shaped through-hole 11 through which the terminal end of the belt webbing of the seat belt (not shown) passes and in which the belt webbing is held, a round hole-shaped insertion hole 12 into which the shaft portion of the bolt 14A is inserted, and the hook portion 13 which is bent and raised in a hook shape hooked into the hooking hole 5B3b of the above-described rear link 5B.

The above-described through-hole 11 is formed to penetrate the lap anchor 10 in the shape of an elongated hole along an edge portion of one side of the lap anchor 10. A resin film for preventing the wear of the belt webbing passed through the through-hole 11 is coated on the inner peripheral portion of the through-hole 11. The insertion hole 12 is formed to penetrate the lap anchor 10 substantially at the center of the lap anchor 10. Specifically, as shown in FIGS. 4 and 5, the insertion hole 12 is formed at the position on the perpendicular bisector of the through-hole 11 in the region on the side (rear lower side) opposite to the side (front upper side) of the above-described through-hole 11 from which the belt webbing (not shown) extends.

Further, as shown in FIG. 3, the hook portion 13 is formed by vertically being bent from a corner portion extending in a tapered shape on the side opposite to the side of the above-described lap anchor 10 in which the through-hole 11 is formed. Specifically, as shown in FIGS. 4 and 5, the hook portion 13 is formed alongside of the above-described insertion hole 12 at a position on the perpendicular bisector of the through-hole 11 and in the region on the side (rear lower side) opposite to the side (front upper side) of the above-described through-hole 11 from which the belt webbing (not shown) extends.

As shown in FIG. 3, the lap anchor 10 having the above configuration is attached to the mounting surface portion 5B3 of the above-described rear link 5B from the outer side in the following manner. First, the lap anchor 10 is brought close to the mounting surface portion 5B3 of the above-described rear link 5B such that their plate shapes come into surface contact with each other. Then, the hook portion 13 of the lap anchor 10 is fitted into the hooking hole 5B3b, and then, the insertion holes 12, 5B3a are aligned with each other. Then, the shaft portion of the bolt 14A is inserted from the outer side into the insertion holes 12, 5B3a which are aligned with each other, and then, is fastened with the nut 14B from the opposite side. In this way, the lap anchor 10 comes into surface contact with the mounting surface portion 5B3 of the rear link 5B in the axial direction (plate thickness direction), so that the lap anchor 10 is firmly and integrally fastened to the mounting surface portion 5B3 of the rear link 5B. Specifically, since the lap anchor 10 is configured such that the above-described hook portion 13 is hooked and fitted in the hooking hole 5B3b, the lap anchor 10 is firmly and integrally fastened to the mounting surface portion 5B3 of the rear link 5B in a state where its rotation movement around the shaft portion of the bolt 14A is stopped.

As shown in FIGS. 4 and 5, by being mounted to the mounting surface portion 5B3 of the above-described rear link 5B, the lap anchor 10 can be assembled in a state where the through-hole 11 through which the belt webbing (not shown) passes protrudes from the mounting surface portion 5B3 of the rear link 5B toward the direction (front upper side) in which the belt webbing extends. In this way, the belt webbing passed through the through-hole 11 of the lap anchor 10 is provided so as not to interfere with the rear link 5B.

As shown in FIGS. 4 and 5, a movable range of the rear link 5B according to the raising and lowering movement of the seat lifter 5 is set within a range in which its rear tilting posture is maintained. Therefore, in the lap anchor 10 mounted to the mounting surface portion 5B3 of the rear link 5B as described above, the through-hole 11 through which the above-described belt webbing (not shown) passes is always kept in a state of protruding from the mounting surface portion 5B3 of the rear link 5B toward the direction (front upper side) in which the belt webbing extends. When receiving a large load input from the belt webbing (not shown) passed through the through-hole 11 due to the front collision of the automobile or the like, the lap anchor 10 can strongly receive the large load by the support of the rear link 5B to which the same lap anchor 10 is attached.

Specifically, the lap anchor 10 can strongly receive, relatively straightly from the rear lower side, the action of the tensile force transmitted from the above-described belt webbing (not shown) to the inner peripheral portion of the through-hole 11 by the insertion-type fastening structure 14 (fastening structure of the bolt 14A and the nut 14B) located on the back side (rear lower side) of the through-hole 11 and a hooking structure of the hook portion 13 to the hooking hole 5B3b. Further, since the rear link 5B supporting the lap anchor 10 is connected to the drive unit 5E that transmits a rotational driving force or braking force for raising and lowering movement to the same rear link 5B, the action of the tensile force transmitted from the belt webbing can be strongly received at a predetermined position due to the braking force exerted by the drive unit 5E.

SUMMARY

To summarize the above, the seat 1 of the present embodiment has the following configurations. That is, the vehicle seat (seat 1) of the present embodiment includes: a seat cushion (seat cushion 3); a seat lifter (seat lifter 5) including a link (rear link 5B on the outer side in the vehicle width direction) which connects the seat cushion (seat cushion 3) and the base (slide rail 4) on a vehicle body and is configured to rotate about an axis extending in a seat width direction and configured to adjust a height of the seat cushion (seat cushion 3) with respect to the vehicle body (floor F) by the rotation of the link (rear link 5B on the outer side in the vehicle width direction); and a fixture (lap anchor 10) For fixing a seat belt which is abutted and attached to a mounting surface portion (mounting surface portion 5B3) of the link (rear link 5B on the outer side in the vehicle width direction), the mounting surface portion (mounting surface portion 5B3) being formed on an outer surface portion of the link (rear link 5B on the outer side in the vehicle width direction) and obliquely facing the front side.

With such a configuration, the fixture (lap anchor 10) of the seat belt can be moved appropriately following the height adjustment of the seat cushion (seat cushion 3) according to the rotation of the link (rear link 5B on the outer side in the vehicle width direction). Further, since the mounting surface portion (mounting surface portion 5B3) of the link (rear link 5B on the outer side in the vehicle width direction), to which the fixture (lap anchor 10) is attached, obliquely faces the front side, the fixture (lap anchor 10) can be attached to the mounting surface portion (mounting surface portion 5B3) in a state of being oriented in a direction to be pulled from the seat belt, so that the fixture (lap anchor 10) can be installed in a state where it is hardly twisted even when receiving the tension. Further, since the mounting direction of the fixture (lap anchor 10) to the mounting surface portion (mounting surface portion 5B3) is set to the direction from the front side rather than from the lateral side, the fixture (lap anchor 10) can be attached from a front open space even when there is no wide mounting space on the lateral side of the mounting surface portion (mounting surface portion 5B3).

Further, the mounting surface portion (mounting surface portion 5B3) also obliquely faces an upper side. With such a configuration, the fixture (lap anchor 10) can be attached to the mounting surface portion (mounting surface portion 5B3) in a state where it is further oriented in a direction to be pulled from the seat belt, and thus, can be installed in a state where it is hardly twisted even when receiving the tension. Further, since the mounting direction of the fixture (lap anchor 10) to the mounting surface portion (mounting surface portion 5B3) is set to the direction from the front upper side, the fixture (lap anchor 10) can be attached from a more open space.

Further, the seat cushion (seat cushion 3) includes a side frame (side frame 3Fa), and the link (rear link 5B on the outer side in the vehicle width direction) is connected to an outer portion of the side frame (side frame 3Fa) and the fixture (lap anchor 10) is attached to an outer portion of the link (rear link 5B on the outer side in the vehicle width direction). With such a configuration, the fixture (lap anchor 10) of the seat belt can be attached to the link (rear link 5B on the outer side in the vehicle width direction) so as not to interfere with the side frame (side frame 3Fa) of the seat cushion (seat cushion 3). Therefore, the link (rear link 5B on the outer side in the vehicle width direction) can be rotated without hindrance.

Further, the mounting surface portion (mounting surface portion 5B3) is formed to partially protrude toward an outer side from the link (rear link 5B on the outer side in the vehicle width direction). In this way, by partially protruding, toward the outer side, the mounting surface portion (mounting surface portion 5B3) to which the fixture (lap anchor 10) of the link (rear link 5B on the outer side in the vehicle width direction) is attached, the fixture (lap anchor 10) hardly interferes with other portions (such as both end portions) of the link (rear link 5B on the outer side in the vehicle width direction) when attaching the fixture (lap anchor 10). Therefore, the fixture (lap anchor 10) can be more easily attached to the link (rear link 5B on the outer side in the vehicle width direction).

Further, the fixture (lap anchor 10) is attached to an intermediate portion (mounting surface portion 5B3) of the link (rear link 5B on the outer side in the vehicle width direction) in a link length direction. With such a configuration, it is possible to secure a large space in which the fixture (lap anchor 10) can be attached to the link (rear link 5B on the outer side in the vehicle width direction), as compared with a configuration in which the fixture (lap anchor 10) is attached to a connecting end portion (such as both end portions 5B4) of the link (rear link 5B on the outer side in the vehicle width direction) at which the link (rear link 5B on the outer side in the vehicle width direction) connects with another member.

Further, the fixture (lap anchor 10) is attached to the link (rear link 5B on the outer side in the vehicle width direction) by a fastening bolt (14A) inserted through the fixture (lap anchor 10) and the link (rear link 5B on the outer side in the vehicle width direction), and a swinging rotation of the fixture (lap anchor 10) around an axis of the fastening bolt (bolt 14A) is regulated. With such a configuration, it is possible to regulate the arrangement direction of the seat belt extending from the fixture (lap anchor 10) within a certain range.

Specifically, the swinging rotation of the fixture (lap anchor 10) around the axis of the fastening bolt (bolt 14A9) is regulated by a convex portion (hook portion 13) which is formed on the fixture (lap anchor 10) and is fitted into a concave portion (hooking hole 5B3b) formed in the link (rear link 5B on the outer side in the vehicle width direction). With such a configuration, the fixture (lap anchor 10) can be firmly and integrally attached to the link (rear link 5B on the outer side in the vehicle width direction) without using welding.

Meanwhile, the regulation of the swinging rotation of the fixture (lap anchor 10) by the fitting between the convex portion (hook portion 13) and the concave portion (hooking hole 5B3b) may be performed by forming the concave portion (hooking hole 5B3b) to have a wider width than the convex portion (hook portion 13) in the rotation direction so as to allow the swinging rotation of the fixture (lap anchor 10) within a certain range.

Further, the seat lifter (seat lifter 5) includes a four-joint link mechanism in which the seat cushion 3 and the base (slide rail 4) are connected by a pair of left and right front links (front links 5A) and rear links (rear links 5B), and a drive unit (drive unit 5E) for transmitting a pivoting force and a braking force to one (rear link 5B on the outer side in the vehicle width direction) of the links configuring the four-joint link mechanism. The link (rear link 5B on the outer side in the vehicle width direction), to which the fixture (lap anchor 10) is attached, is configured to receive the transmission of the braking force from the drive unit (drive unit 5E). With such a configuration, when a large load such as the body pressure of the seated occupant, which is strongly pressed against the seat belt, is inputted, the link (rear link 5B on the outer side in the vehicle width direction), to which the fixture (lap anchor 10) is attached, is not rotated by the load input, and the load can be stably received at a predetermined position.

Second Embodiment

Figure 8:
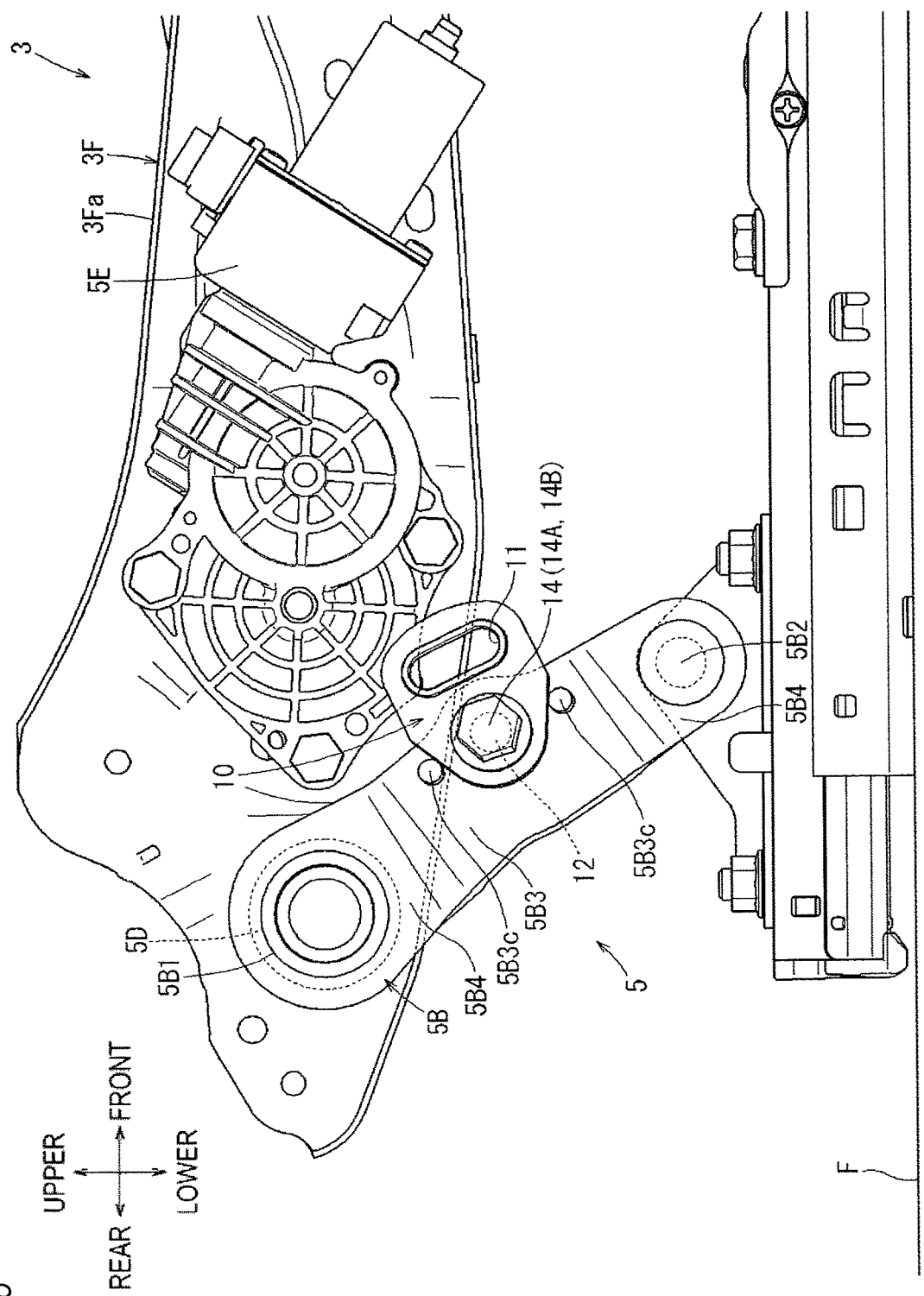
FIG. 8 is a side view of a main part corresponding to FIG. 5, showing a schematic configuration of a vehicle seat according to a second embodiment.

Subsequently, a configuration of a seat 1 (vehicle seat) of a second embodiment is described with reference to FIG. 8. In the present embodiment, protrusions 5B3c are provided to protrude from the mounting surface portion 5B3 of the rear link 5B (link) on the outer side in the vehicle width direction. The protrusions 5B3c abut against the lap anchor 10 (fixture) attached on the mounting surface portion 5B3 from both directions in the rotation direction. By the structure in which each of the protrusions 5B3c abuts against the lap anchor 10 from both directions in the rotation direction, the lap anchor 10 is integrally attached to the rear link 5B in a state where its swinging rotation around the axis of the bolt 14A is regulated.

Meanwhile, the regulation of the swinging rotation of the lap anchor 10 by the protrusions 5B3c may be performed with a clearance in the rotation direction between each protrusion 5B3c and the lap anchor 10 so as to allow the swinging rotation of the lap anchor 10 within a certain range. Further, extension portions extending radially from the lap anchor 10 may be formed like the hook portion 13 extending radially from the lap anchor 10 shown in the first embodiment, and the protrusions 5B3c may be provided to be abutted against the extension portions from both directions in the rotation direction (including the case in which a certain clearance is provided between the protrusion and the extension portion). Further, besides the structure in which each protrusion is integrally formed by being extruded from the lap anchor 10 in a plate thickness direction (axial direction), each protrusion 5B3c may be formed as a structure of a separate member that is attached to the lap anchor 10 by being axially press-fitted or caulked or welded. Since the configurations other than the above are the same as those of the seat 1 shown in the first embodiment, the same reference numerals are given and the description thereof will be omitted.

Other Embodiments

Although the disclosure has been described with reference to two embodiments, the disclosure can be implemented in various forms other than the above embodiments. For example, the "vehicle seat" of the disclosure can also be applied to seats other than the right seat of the automobile. Further, the "vehicle seat" of the disclosure can also be widely applied to seats provided for vehicles other than the automobile, such as a train, an airplane and a ship.

Further, the seat lifter may adjust the height of the seat cushion by the link movement of a so-called pantograph type link mechanism assembled in an X shape. Moreover, the fixture for fixing the seat belt to be attached to the link configuring the seat lifter is not limited to the lap anchor shown in the above embodiments but may be a buckle for mounting a tongue plate through which a belt webbing has passed. In addition, the seat lifter may be configured to be manually raised and lowered by an operation of raising and lowering an operation lever, as in the structure disclosed in documents such as JP-A-2015-067135.

Further, the fixture does not necessarily need to be integrally attached to the link but may be attached in a rotatably pin-connected state. Moreover, the fixture may be attached to the link by means other than an insertion-type fastening structure such as welding or caulking. In addition, the fixture may be attached indirectly to the link via a separate member such as a bracket without directly coming into contact with the link, in addition to being attached to the link in direct contact with the link. Further, the fixture may be attached to an end portion of the link, in addition to being attached to the intermediate portion of the link in the link length direction.

Further, the mounting surface portion may be formed so as to face the front side at a position drawn inward from the link, in addition to facing the front side at the position protruding outward from the link.

What is claimed is:

1. A vehicle seat comprising:
a seat cushion;
a seat lifter including a link which connects the seat cushion and a base on a vehicle body, wherein the link is operable to rotate about an axis extending in a seat width direction and wherein the seat lifter is operable to adjust a height of the seat cushion with respect to the vehicle body by the rotation of the link; and
a fixture for fixing a seat belt, wherein the fixture is abutted and attached to a mounting surface portion of the link, the mounting surface portion being formed on an outer surface portion of the link and inclined in the seat width direction so that the mounting surface portion is obliquely facing forwardly with respect to a seat front and rear direction.

2. The vehicle seat according to claim 1,
wherein the mounting surface portion is inclined in the seat width direction so that the mounting surface portion also obliquely faces upwardly with respect to a seat upper and lower direction.

3. The vehicle seat according to claim 1,
wherein the seat cushion includes a side frame, and
wherein the link is connected to an outer portion of the side frame and the fixture is attached to an outer portion of the link.

4. The vehicle seat according to claim 1,
wherein the mounting surface portion is formed to partially protrude toward an outer side of the seat in the seat width direction than other portions of the link.

5. The vehicle seat according to claim 1,
wherein the fixture is attached to an intermediate portion of the link in a link length direction.

6. The vehicle seat according to claim 1,
wherein the fixture is attached to the link by a fastening bolt inserted through the fixture and the link, and
wherein a swinging rotation of the fixture around an axis of the fastening bolt is regulated.

7. The vehicle seat according to claim 6,
wherein the swinging rotation of the fixture around the axis of the fastening bolt is regulated by a convex portion which is formed on the fixture and is fitted into a concave portion formed in the link.

8. The vehicle seat according to claim 6,
wherein the swinging rotation of the fixture around the axis of the fastening bolt is regulated by protrusions which are formed on the mounting surface portion so as to protrude toward an outer side of the vehicle seat and abut against the fixture from two sides of the fixture in a swinging rotation direction of the fixture, respectively.

* * * * *